United States Patent [19]
Fagan, Jr.

[11] 3,956,724
[45] May 11, 1976

[54] SUPERCONDUCTIVE WINDING WITH COOLING PASSAGES

[75] Inventor: Thomas J. Fagan, Jr., Pittsburgh, Pa.

[73] Assignee: Westinghouse Electric Corporation, Pittsburgh, Pa.

[22] Filed: Dec. 12, 1974

[21] Appl. No.: 532,286

Related U.S. Application Data

[63] Continuation of Ser. No. 307,315, Nov. 16, 1972, now Defensive Publication No. T913,004.

[52] U.S. Cl................................ 335/216; 335/300; 174/128 S
[51] Int. Cl.²........................................ H01F 7/22
[58] Field of Search................... 335/216, 299, 300; 174/DIG. 6, 128 S

[56] References Cited
UNITED STATES PATENTS

| | | | |
|---|---|---|---|
| 3,187,235 | 6/1965 | Berlincourt et al. | 335/216 |
| 3,428,926 | 2/1969 | Bogner et al. | 335/216 |
| 3,710,000 | 1/1973 | Shattes et al. | 335/216 X |

*Primary Examiner*—G. Harris
*Attorney, Agent, or Firm*—G. H. Telfer

[57] ABSTRACT

Individual wires in a winding are formed as polygons having contacting faces and noncontacting faces. Contacting faces of adjacent wires are positively engaged, while the noncontacting faces of adjacent wires form the periphery of openings that extend through the winding. Insulation may be removed from the noncontacting faces to facilitate cooling.

8 Claims, 1 Drawing Figure

U.S. Patent   May 11, 1976   3,956,724
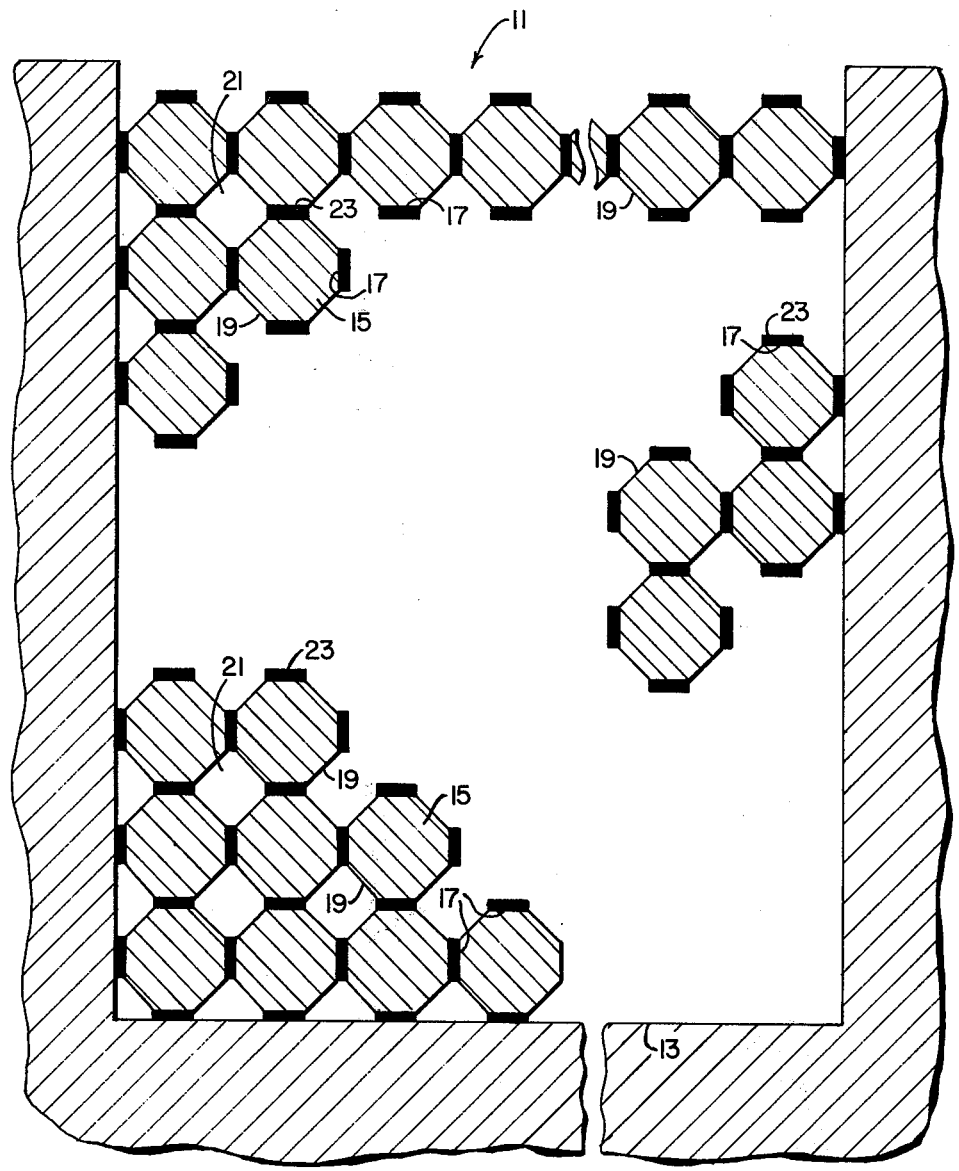

SUPERCONDUCTIVE WINDING WITH COOLING PASSAGES

This is a continuation of application Ser. No. 307,315 filed Nov. 16, 1972, now Defensive Publication T913,004 published Aug. 14, 1973.

BACKGROUND OF THE INVENTION

1. Field of the Invention

This invention relates primarily to an electrical winding or coil and the method of fabricating such a winding, and more specifically, this invention relates to the structure and method of fabrication of a superconductive winding with cooling passages formed therein.

2. Description of the Prior Art

The phenomenon of superconductivity (i.e., the exhibition of no electrical resistance by some materials when cooled to near absolute zero) has been known since 1911. In view of the very large currents and corresponding high density magnetic fields that can be achieved by utilization of superconductors, the possibilities for use of the superconductive effect in certain electromagnetic devices requiring high magnetic fields is obvious. within the last 10 or 12 years, and especially within the last 2 or 3 years, interest in utilizing superconductors in electromagnetic devices has mushroomed.

As the superconductive effect will be "quenched" or lost unless the superconductors are maintained at very low temperatures, it is imperative that adequate refrigeration or cooling arrangements be provided. Thus, when a winding or coil is formed of superconductive wires, provision must be made for bringing a coolant or refrigerant into intimate contact with the superconductors. (Of course, the benefits and advantages that may be derived from introducing a coolant to the interior of a conventional winding or coil are also clear.)

Prior art arrangements have normally involved either loosely bundled windings or tightly bundled windings having flow separators of various types. Examples of this latter type of structure may be seen in: U.S. Pat. No. 3,559,126 - Drautman, Jr.; U.S. Pat. No. 3,501,727 - Kafka; U.S. Pat. No. 3,444,307 - Kafka; U.S. Pat. No. 3,416,111 - Bogner; and U.S. Pat. No. 3,363,207 - Brechna.

In the loosely bundled winding, there might be relative motion between the individual cables or wires that form the winding. Such relative movement results in a number of deleterious effects, especially when superconductors are utilized. First of all, the relative motion of the conductors causes abrasion of the insulation that can lead to electrical failures. In addition, the motion of the individual conductors relative to the magnetic field results in electromagnetic losses. These losses result, of course, in heating that increases the amount of cryogenic refrigeration that is required. If these losses are great enough, quenching of the superconductors may result, with the subsequent loss of the magnetic field. Another cause of undesired heating in a loosely bundled winding, leading to the same deleterious effects as electromagnetic losses, is mechanical friction between the conductors. A further problem resulting from movement of the conductors is that the shape of the magnetic field may be altered with attendant disadvantages, A still further disadvantage of the loosely bundled windings is that they can become tightly packed in certain areas, leading to a "hot spot" at such a locality.

Because of the many problems associated with loosely packed windings, various attempts have been made to utilize tightly bound windings separated by some type of porous medium, generally a copper mesh. Although this type of winding is much more mechanically stable than a loosely bound winding, it also has a number of disadvantages. For one thing, the spacer occupies some volume of the winding. In addition, the spacers utilized generally have relatively low structural rigidity and thus some conductor motion may still result. Further, the use of such spacers will generally result in increases in the time and cost of producing the winding. Still further, normally only one portion of the conductors are cooled, and heat must be generally removed through a layer of electrical insulation.

The system disclosed in the above-identified Brechna patent involves a structure that is proposed to improve the cooling effect by directing the coolant around the conductors as well as through the porous medium that separates layers of the conductors. However, the Brechna arrangement still involves the other disadvantages referred to in connection with windings that utilize spacers.

SUMMARY OF THE INVENTION

One method of improving upon prior art superconducting windings is disclosed in the copending application of Daniel W. Deis entitled "METHOD OF FABRICATION AND STRUCTURE OF A MECHANICALLY STABLE ELECTRICAL WINDING HAVING COOLING OPENINGS THEREIN", Ser. No. 307,314, filed on Nov. 11, 1972, and assigned to the same assigneee as the present invention. The invention disclosed in the Deis application is a great improvement over prior art devices and yields a winding that is very stable mechanically, with cooling openings passing therethrough.

The present invention involves another approach to achieving excellent mechanical stability in a superconductive winding, while also providing an arrangement for effectively cooling the superconductors. In addition, an excellent ratio of superconductor per unit winding may be achieved.

Briefly, these results are achieved by utilizing a configuration of the superconductive wires such that when the wires are formed into a winding appropriate cooling passages are formed in the winding. The structure of these wires is such that adjacent wires are insulated from each other where they are in contact, but the insulation may be removed from the areas which form the cooling passages to increase the efficiency of the cooling. These wires may be tightly packed, and the resulting structure is very stable mechanically and yet provides a very efficient cooling arrangement. Wires having cross-sections with many different polygonal shapes (constructed of either straight or arcuate sides, or combinations thereof) of wire may be utilized, so long as appropriate contacting and noncontacting faces are provided. The contacting faces of the wire are arranged to positively engage the contacting faces of adjacent wires, when formed into a winding. The positive engagement of the contacting faces is essential to preclude movement (especially rotational movement) of the individual wires. When a plurality of wires are tightly packed with the contacting faces of adjacent wires being positively engaged, the noncontacting faces provide a closed periphery for passages that are formed through the winding. (It should be noted that the "closed periphery" will normally include a small amount of insulation where the ends of adjacent noncontacting faces come together.) If the insulation is removed from the noncontacting faces, the coolant passing through the passages is in direct contact with the superconductors to provide a better cooling efficiency. A particularly useful form of the wire is one in which a cross-section of the wire has the shape of an octagon. The contacting faces provide alternate sides of the octagon, while noncontacting nonacting faces provide the sides interconnecting the sides represented by the contacting faces.

The foregoing and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

The sole FIGURE of the drawing illustrates a preferred embodiment of an electrical winding constructed pursuant to the present invention.

DESCRIPTION OF THE PREFERRED EMBODIMENT

An electrical winding 11, such as a superconductive winding, is illustrated as being formed in a chamber 13. Chamber 13 may be any appropriate container, such as a winding slot in a dynamoelectric machine. Of course, chamber 13 is not restricted to a winding slot, as the winding formed pursuant to this invention may be utilized in any suitable electromagnetic device. Also, while the description of this preferred embodiment is made with respect to a winding utilizing superconductive wires, the invention may be equally applicable to windings utilizing conventional conductors.

A plurality of stabilized superconductive wires 15 are utilized to form the winding. Superconductive wires 15 may be any type of stabilized superconductive structure, such as, for example, a multiplicity of niobium-titanium filaments encased within a copper sheath.

Each of the superconductive wires 15 has a plurality of contacting faces 17 and a plurality of noncontacting faces 19. The particular shape that the superconductive wires 15 may take to provide the contacting faces 17 and noncontacting faces 19 varies to a considerable extent. For example, contacting faces 17 could be shaped to provide various mating arrangements with either straight or arcuate sides that would provide a very positive engagement between adjacent wires. Probably the most worrisome type of movement that could occur with this type of structure would be a twisting of the superconductive wires 15. This would produce a torque that could cause rotation of the wires if, for example, round wires were merely packed adjacent each other. However, when the wires are tightly packed, forming the contacting faces in the flat structure as shown provides a sufficiently positive engagement to yield the desired results.

As in the case of the contacting faces, the noncontacting faces 19 may take any of a great number of different shapes. For example, they could be straight to provide square passages 21, or they could be curvilinear to form circular or oblong passages. The main requirement for these sides is that when adjacent wires have contacting faces 17 forced together, the noncontacting faces 19 are spaced apart to provide passages 21.

As may be seen from the drawing, the preferred embodiment shown herein utilizes superconductive wires having an octagonal cross-section. The contacting faces 17 provide alternate sides of the octagon, while noncontacting faces 19 interconnect the contacting faces 17 to provide the other sides of the octagon. The advantages of this particular shape is that such wires would be easy to produce and, as a result of the symmetry, would be easy to wind in the chamber 12.

A layer of insulating material 23 may be coated over the superconductive wires 15. The insulating material 23 aids in forming a positive engagement between the contacting faces 17 and insulates each of the superconductive wires from the adjacent wires having contacting faces in engagement with its contacting faces. This insulating material 23 may be of any suitable type of material, such as a phenolic modified polyvinyl formal.

Although not absolutely necessary, the insulating material 23 may be removed from the noncontacting faces 19. The advantage of this approach is that with the insulation removed the cooling fluid passing through passages 21 may directly contact the superconducting wires 15 to assist in maintaining these wires at the low temperatures required for superconductivity. Generally, the most effective method would be to coat the wires 15 with the insulation 23 and then remove it from the noncontacting faces 19. However, in some cases it might be desirable to initially place insulating material 23 on just the contacting faces 17.

When wires 15 have been prepared, they are wound in chamber 13 in such a way as to be tightly packed therein. Contacting faces 17 are forced into engagement with the contacting faces 17 of adjacent wires 15. When the winding is completed, the positive engagement between contacting faces 17 provides a very strong structure, and the winding 11 exhibits excellent mechanical stability. In addition, when the contacting faces of wires 15 are forced together, the noncontacting faces 19 (with small sections of insulation 23) provide a completely closed periphery for passages 21 that extend through the winding 11. Hence, a very stable winding structure is provided that has a large proportion of superconductor per unit of winding. Further, passages are established through the winding to permit a large flow of a cryogenic fluid and the resultant high cooling efficiency, while occupying a minimal amount of space and without reducing the structural stability of the winding.

It should be understood that various modifications, changes and variations may be made in the arrangements, operations and details of construction of the elements disclosed herein without departing from the spirit and scope of the present invention.

What is claimed is:
1. An electrical winding comprising:
 a multiplicity of tightly packed conductors, each of said conductors having a cross-section in the form of a polygon with a multiplicity of sides;
 a plurality of contacting faces formed on the circumference of each of said conductors and providing some of the sides of said polygon, each of said contacting faces positively engaging a contacting face of an adjacent conductor; and
 a plurality of noncontacting faces formed on the circumference of each of said conductors and providing some of the sides of said polygon, the engagement of said contacting faces of adjacent conductors causing said conductors to be spaced as to establish passages through the winding, said noncontacting faces of said conductors providing closed peripheries for the passages.

2. A winding as claimed in claim 1 wherein said conductors are stabilized superconductive wires.

3. A winding as claimed in claim 1 wherein said conductors are covered with a layer of insulating material.

4. A winding as claimed in claim 3 wherein said noncontacting faces have said insulating material removed therefrom.

5. A winding as claimed in claim 1 wherein:
said polygon is an octagon; and
said contacting and said noncontacting faces provide alternate sides of the octagon.

6. A winding as claimed in claim 5 wherein:
said conductors are stabilized superconductive wires; and
only said contacting faces are covered with a layer of insulating material.

7. A superconductive wire comprising:
a plurality of contacting faces formed on the circumference of the wire, each of said contacting faces adapted to positively engage a contacting face of another wire;
a plurality of noncontacting faces formed on the circumference of the wire, said noncontacting faces interconnecting adjacent contacting faces so that the cross-section of the wire is in the shape of a polygon; and
a layer of insulating material located on said contacting faces.

8. A wire as claimed in claim 7 wherein:
said polygon is an octagon; and
said contacting faces and said noncontacting faces provide alternate sides of the octagon.

* * * * *